US008980204B2

(12) United States Patent
Krishnamurthy et al.

(10) Patent No.: US 8,980,204 B2
(45) Date of Patent: Mar. 17, 2015

(54) PROCESS AND SYSTEM FOR SYNGAS TREATMENT

(75) Inventors: Gowri Krishnamurthy, Allentown, PA (US); Charles Roland Higdon, III, Allentown, PA (US); Christine Peck Kretz, Macungie, PA (US); Carmine Richard Gagliardi, Macungie, PA (US); Kevin M. Duffy, Alburtis, PA (US); Kuo-Kuang Hsu, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 732 days.

(21) Appl. No.: 13/114,091

(22) Filed: May 24, 2011

(65) Prior Publication Data
US 2012/0128560 A1 May 24, 2012

Related U.S. Application Data

(60) Provisional application No. 61/347,496, filed on May 24, 2010.

(51) Int. Cl.
| B01D 47/00 | (2006.01) |
| B01D 53/56 | (2006.01) |
| C01D 1/32 | (2006.01) |
| C10K 1/04 | (2006.01) |
| B01D 53/52 | (2006.01) |
| B01D 53/58 | (2006.01) |
| B01D 53/64 | (2006.01) |
| B01D 53/68 | (2006.01) |
| B01D 53/75 | (2006.01) |
| B01D 53/86 | (2006.01) |
| C10K 1/10 | (2006.01) |
| C10K 1/32 | (2006.01) |
| C10K 1/34 | (2006.01) |
| C10J 3/18 | (2006.01) |
| C10K 1/02 | (2006.01) |
| C10K 1/06 | (2006.01) |
| C10K 1/12 | (2006.01) |

(52) U.S. Cl.
CPC . *C10K 1/04* (2013.01); *B01D 53/52* (2013.01); *B01D 53/58* (2013.01); *B01D 53/64* (2013.01); *B01D 53/68* (2013.01); *B01D 53/75* (2013.01); *B01D 53/8606* (2013.01); *C10K 1/101* (2013.01); *C10K 1/32* (2013.01); *C10K 1/34* (2013.01); *C10J 3/18* (2013.01); *C10K 1/028* (2013.01); *C10K 1/06* (2013.01); *C10K 1/103* (2013.01); *C10K 1/125* (2013.01); *B01D 2251/902* (2013.01); *B01D 2252/103* (2013.01); *B01D 2253/102* (2013.01); *B01D 2253/1124* (2013.01); *B01D 2255/20738* (2013.01); *B01D 2255/20761* (2013.01); *B01D 2255/20792* (2013.01); *B01D 2255/2092* (2013.01); *B01D 2256/16* (2013.01); *B01D 2256/20* (2013.01); *B01D 2257/2045* (2013.01); *B01D 2257/304* (2013.01); *B01D 2257/308* (2013.01); *B01D 2257/406* (2013.01); *B01D 2257/602* (2013.01); *Y02E 20/16* (2013.01); *Y02E 50/12* (2013.01); *C10J 2300/1643* (2013.01); *C10J 2300/0946* (2013.01); *C10J 2300/1238* (2013.01)
USPC .......................... 423/210; 423/238; 423/187

(58) Field of Classification Search
None
See application file for complete search history.

(56) References Cited

U.S. PATENT DOCUMENTS

| 3,854,895 A | 12/1974 | Muller |
| 3,890,113 A | 6/1975 | Child et al. |
| 3,976,443 A | 8/1976 | Paull et al. |
| 4,081,253 A | 3/1978 | Marion |
| 4,091,073 A * | 5/1978 | Winkler ......................... 423/226 |
| 4,110,359 A | 8/1978 | Marion |
| 4,141,696 A | 2/1979 | Marion et al. |
| 4,437,417 A * | 3/1984 | Roberts ......................... 588/320 |
| 5,280,757 A | 1/1994 | Carter et al. |
| 5,470,361 A * | 11/1995 | Linke et al. ................. 48/197 R |
| 6,250,236 B1* | 6/2001 | Feizollahi ..................... 110/346 |
| 6,987,792 B2 | 1/2006 | Do et al. |
| 7,666,383 B2* | 2/2010 | Green .......................... 423/450 |
| 8,137,655 B2* | 3/2012 | Chornet et al. .............. 423/654 |
| 2004/0247509 A1 | 12/2004 | Newby |
| 2008/0056971 A1 | 3/2008 | Hughes |

(Continued)

FOREIGN PATENT DOCUMENTS

| AU | 498 077 B2 | 2/1979 |
| CN | 101501166 A | 8/2009 |

(Continued)

OTHER PUBLICATIONS

Faaij, A., et al.; "Gasification of Biomass Wastes and Residues for Electricity Production"; Biomass and Bioenergy; vol. 12, No. 6; pp. 387-407; 1997.

(Continued)

*Primary Examiner* — Melvin C Mayes
*Assistant Examiner* — Sheng H Davis
(74) *Attorney, Agent, or Firm* — Michael K. Boyer; Amy Carr-Trexler

(57) ABSTRACT

A process for the clean-up of a crude syngas stream having widely varying composition and particulate load. The process includes quenching the crude syngas stream with a liquid stream to cool the syngas stream and remove particulates, tars and heavier hydrocarbon compounds. The process further includes co-scrubbing the syngas stream to remove both HCl and $NH_3$ from the syngas stream, removing particulate matter from the syngas stream, and removing sulfur from the syngas stream. A syngas treatment system is also disclosed.

19 Claims, 8 Drawing Sheets

(56) References Cited

U.S. PATENT DOCUMENTS

| | | | |
|---|---|---|---|
| 2008/0081844 A1* | 4/2008 | Shires et al. | 518/703 |
| 2008/0202028 A1 | 8/2008 | Tsangaris et al. | |
| 2008/0210089 A1 | 9/2008 | Tsangaris et al. | |
| 2009/0064581 A1 | 3/2009 | Nielsen et al. | |
| 2009/0133407 A1 | 5/2009 | Sawyer | |
| 2009/0151250 A1 | 6/2009 | Agrawal | |
| 2010/0199557 A1 | 8/2010 | Dighe et al. | |

FOREIGN PATENT DOCUMENTS

| | | |
|---|---|---|
| DE | 22 12 700 A1 | 9/1973 |
| EP | 0594231 * | 9/1993 |
| EP | 1 419 220 B1 | 11/2005 |
| EP | 2 223 889 A2 | 9/2010 |
| WO | 2007/017155 A2 | 2/2007 |
| WO | 2007/073454 A1 | 6/2007 |
| WO | 2007/094914 A1 | 8/2007 |
| WO | 2008/044216 A1 | 4/2008 |
| WO | 2008/077233 A1 | 7/2008 |
| WO | 2009/034285 A2 | 3/2009 |
| WO | 2009/076138 A1 | 6/2009 |
| WO | 2009/132449 A1 | 11/2009 |
| WO | 2010/093553 A2 | 8/2010 |
| WO | 2010/118513 A1 | 10/2010 |

OTHER PUBLICATIONS

McManus, D., et al; "The Evolution, Chemistry and Applications of Chelated Iron Hydrogen Sulfide Removal and Oxidation Processes"; Journal of Molecular Catalysis A: Chemical 117; pp. 289-297; 1997.

Iliuta, I., et al.; "Concept of Bifunctional Redox Iron-Chelate Process for H2S Removal in Pulp and Paper Atmospheric Emissions"; Chemical Engineering Science 58; pp. 5305-5314; 2003.

Morris, M., et al.; "Energy Recovery from solid Waste Fuels using Advanced Gasification Technology"; Waste Management; vol. 18; 1998; pp. 557-564.

Na, et al; "Characteristics of Oxygen-Blown Gasification for Combustible Waste in a Fixed-Bed Gasifier"; Applied Energy; vol. 75; 2003; pp. 275-285.

Minutillo, A., et al.; Modelling and Performance Analysis of an Integrated Plasma Gasification Combined Cycle (IPGCC) Power Plant; Energy Conversion and Management; vol. 50; 2009; pp. 2837-2842.

Vaidyanathan, A., et al.; "Characterization of Fuel Gas Products from the Treatment of Solid Waste Streams with a Plasma Arc Torch"; Journal of Environmental Management; vol. 82; 2007; pp. 77-82.

Mountouris, A., et al.; "Plasma Gasification of Sewage Sludge: Process Development and Energy Optimization"; Energy Conversion and Management; vol. 49; 2008; pp. 2264-2271.

Burnley, S.; "A Review of Municipal Solid Waste Composition in the United Kingdom"; Waste Management; vol. 27; 2007; pp. 1274-1285.

Huang, Wen-Ling, et al.; "Recycling of Construction and Demolition Waste Via a Mechanical Sorting Process"; Resources, Conservation and Recycling; vol. 37; 2002; pp. 23-37.

Bossink, B.A.G., et al.; "Construction Waste: Quantification and Source Evaluation"; Journal of Construction Engineering and Management; Mar. 1996; pp. 55-60.

Themelis, N.J., et al.; "Energy Recovery from New York City Municipal Solid Wastes"; Waste Manage Res.; 2002; pp. 223-233.

Rademakers, P., et al.; "Review on Corrosion in Waste Incinerators, and Possible Effect of Bromine"; TNO Industrial Technology; 2002; pp. 1-51.

"Municipal Solid Wastes in USA: Facts and Figures"; Office of Solid Waste and Emergency Response; EPA 530-R-03011; Washington DC, 2003.

* cited by examiner

PROCESS AND SYSTEM FOR SYNGAS TREATMENT

This application claims the benefit of U.S. Provisional Application No. 61/347,496, filed on May 24, 2010. The disclosure of this application is hereby incorporated by reference.

BACKGROUND OF THE INVENTION

The present disclosure is directed to a process and system for the generation and treatment of syngas. In particular, the present disclosure is directed to a process and system for the treatment of a crude syngas stream produced by the plasma gasification of waste, including municipal solid waste (MSW).

The effective management and utilization of waste is a global issue. Current waste management techniques, as suggested by regulatory agencies, such as the U.S. Environmental Protection Agency (EPA), include source reduction first, recycling and composting second, and, finally, disposal in landfills or waste combustors. Other techniques of managing waste include converting the waste to energy involving processes such as incineration and pyrolysis. There are many types of waste including municipal solid waste, commercial and industrial waste, refuse derived fuel (RDF), construction and demolition waste, electronic waste, medical waste, nuclear waste, and hazardous waste. Municipal solid waste (MSW), also called urban solid waste, trash, rubbish, or garbage, mainly comprises household/domestic waste. MSW is generally in solid/semi-solid form and includes paper and card, plastic, textiles, glass, metals, biodegradable waste (e.g., kitchen waste, yard sweepings/trimmings, wood waste), inert waste (e.g., dirt, rocks) and may include small quantities of miscellaneous materials such as batteries, light bulbs, medicines, chemicals, fertilizers, among other materials. Typically MSW is found to be predominantly paper/card and kitchen waste, although exact compositions can vary from one region to another (e.g., depending upon the levels of recycling carried out in that region). RDF refers to MSW and/or commercial and/or industrial waste which has been pre-sorted, typically to remove recyclable material.

Another form of waste management includes gasification. Gasification is a process for the conversion of a carbonaceous feedstock such as coal, petroleum, biofuel, biomass, municipal solid waste (MSW), and other wastes into a combustible gas such as synthesis gas. Synthesis gas, commonly referred to as syngas is a mixture of varying amounts of carbon monoxide and hydrogen ($CO+H_2$) and has a variety of applications. The syngas can be used to generate power by combusting directly in a gas turbine, boiler or reciprocating engine, by feeding into a fuel cell, and/or waste heat can be used in the generation of steam which can provide additional power through a steam turbine. Syngas can also be used for the production of hydrogen or liquid fuels or chemicals, gaseous fuels, synthetic natural gas, and/or carbon monoxide, some of which may be used as raw materials in the manufacture of other chemicals such as plastics. Gasification is thus a process for producing value added products and/or energy from organic materials.

A particular form of gasification includes plasma gasification. Plasma gasification is a waste treatment technology that uses electrical energy and the high temperatures created by a plasma arc to break down waste into a gaseous product which contains syngas and molten, glass-like by-product (slag) in a vessel called the plasma gasification reactor. Plasma is a high temperature luminous gas that is partially ionized and is made up of gas ions, atoms and electrons. Slag is produced from the vitrification of inorganic mineral matter such as glass and metals which are often contained in waste.

Depending on the composition of the waste used as feedstock and the gasification process employed, the gaseous product containing syngas may comprise $CO$, $H_2$, $H_2O$, $HCN$, $CO_2$, $N_2$, $O_2$, $CH_4$, $H_2S$, $COS$, $NH_3$, $HCl$, $Ar$, $Hg$, $C_xH_y$, and other heavier hydrocarbons (tars), particulates comprising char, ash, and/or unconverted fuel. Heavy hydrocarbons, heavier hydrocarbon compounds or tars refers to hydrocarbons that may be saturated, unsaturated, or partially saturated as well as hydrocarbons that may include other atoms such as, but not limited to, oxygen, nitrogen, or sulfur. One of the challenges of carrying out a waste plasma gasification process is that the widely varying nature of the waste can lead to a widely varying gas and and hydrocarbon compositions as well as particulate amounts and sizes coming out of the gasifier, which shall herein be defined as the "crude syngas stream". The clean-up of this widely varying crude syngas stream is particularly challenging if the final product of the overall process is power, especially power that is produced with a gas turbine, reciprocating engine, or an internal combustion engine. In all of these power production processes, particulates are desirably removed down to at 50 ppm or less regardless of the widely varying amount of particulates in the crude syngas stream. Despite the potential for a wide variation of hydrocarbon compositions and/or tars, the cooling system of a 24/7 power generation facility cannot afford to be shut down due to fouling issues caused by the formation of tars at an undesired location in the process. Thus, the production of power from waste requires a different and unique syngas clean-up system relative to those of solid and liquid fossil fuels such as coal, pet coke, asphaltenes, and many biomass gasification clean-up systems.

US Patent Publication No. 2009/0133407 A1, which is hereby incorporated by reference in its entirety, discloses a system for producing and processing syngas from waste using a plasma gasifier. US Patent Publication No. 2009/0133407 A1 generally refers to a gas clean-up train prior to conversion of the syngas to energy but do not disclose co-scrubbing of HCl and $NH_3$. US Patent Publication No. 2009/0133407 A1 discloses a particulate removal system but do not address the high particulate loads that are typical of syngas formed from waste. In addition, the system disclosed in US Patent Publication No. 2009/0133407 A1 discloses a bioreactor for $H_2S$ removal and involves a heat recovery steam generator coupled to the syngas cooler immediately downstream of the gasifier to provide heat energy input back to the plasma cupola or to provide heat to the integrated electric generation cycle. The heat recovery system of US Patent Publication No. 2009/0133407 A1 is less desirable and less robust for waste gasification as it may be less tolerant to the wide range of metal, particulate and condensable by-products present in the stream exiting the gasifier which may lead to tar formation.

US Patent Publication No. 2008/210089 A1, which is hereby incorporated by reference in its entirety, discloses a gas conditioning system for processing an input gas from a gasification system. US Patent Publication No. 2008/210089 A1 fails to disclose co-scrubbing of HCl and NH3 and does not disclose COS hydrolysis for sulfur removal. The limitation of this patent's process is that it will not allow for complete sulfur removal, particularly that in the form of COS. The separate removal of HCl and $NH_3$ in the US Patent Publication No. 2008/210089 A1 requires more unit operations to remove HCl and $NH_3$ to desired levels, which requires more equipment, more energy and less efficient processing.

Gas treatment processes and systems for treating high particulate-containing and widely varying crude syngas streams are needed to efficiently treat syngas streams formed from plasma gasification of waste streams, including, but not limited to municipal solid waste. The cleaned syngas composition will vary depending upon whether one intends to render it suitable for power generation, fuel or chemical manufacture, hydrogen production, or other applications that utilize CO and/or $H_2$.

BRIEF SUMMARY OF THE INVENTION

The instant invention solves problems associated with conventional processes by providing a process and system for treating a crude syngas stream.

One aspect of the present disclosure includes a process for the clean-up of a crude syngas stream having widely varying composition and particulate load. The process includes quenching the crude syngas stream with a liquid stream to cool the syngas stream (e.g., using a liquid stream comprising water to cool the crude syngas stream to a temperature of less than about 212 F (100 C)), and remove particulates, tars and other heavier hydrocarbon compounds. The process further includes co-scrubbing the syngas stream to remove both HCl and $NH_3$ from the syngas stream, removing particulate matter from the syngas stream, optionally removing mercury from the syngas stream, and removing sulfur from the syngas stream. The process may also include an optional pH adjustment via acid or base.

Another aspect of the present disclosure includes a process for the clean-up of a crude syngas stream having widely varying composition and particulate load arising from waste gasification. The process includes providing a crude syngas stream from a plasma gasifier and quenching the crude syngas stream with a liquid stream to cool the syngas stream and remove particulates, tars and other heavier hydrocarbon compounds. The process further includes co-scrubbing the syngas stream to remove both HCl and $NH_3$ from the syngas stream, removing additional particulate matter from the syngas stream, optionally removing mercury from the syngas stream, and removing sulfur from the syngas stream. By additional particulate matter it is meant particulate matter that has not been previously removed during the quenching or co-scrubbing process. The process may also include an optional pH adjustment via acid or base.

Another aspect of the present disclosure includes a syngas treatment system. The system includes a crude syngas stream quenching sub-system for quenching a crude syngas stream, a co-scrubbing sub-system for removing HCl and $NH_3$ from the syngas, an additional particulate removal sub-system for removing particulates from the syngas, an optional mercury removal system, and a sulfur removal system for removing sulfur from the syngas. The system may also include an optional pH adjustment sub-system that uses acid or base. The crude syngas stream quenching sub-system, co-scrubbing sub-system, additional particulate removal sub-system, sulfur removal sub-system are operably arranged to remove HCl, $NH_3$, particulates and sulfur from the crude syngas stream to form a clean syngas stream.

The system and the process of the present disclosure includes an ability to condition, treat and otherwise process the high particulate content of such a crude syngas stream and the presence of HCl and $NH_3$ in substantially similar concentrations to allow for co-scrubbing and effective sulfur removal. The gas treatment system is applicable to a wide range of systems including those in which the waste is co-fired with coal and/or metallurgical coke and/or petroleum coke and/or alternative carbon sources.

This disclosure provides a system and a process for the effective clean-up, purification, or conditioning of the highly heterogeneous gas stream produced by the plasma gasification of wastes, including, but not limited to MSW, commercial, RFD, and/or industrial wastes.

Other features and advantages of the present invention will be apparent from the following more detailed description of certain embodiments, taken in conjunction with the accompanying drawings which illustrate, by way of example, the principles of the invention.

DETAILED DESCRIPTION OF THE INVENTION

Figure 1:
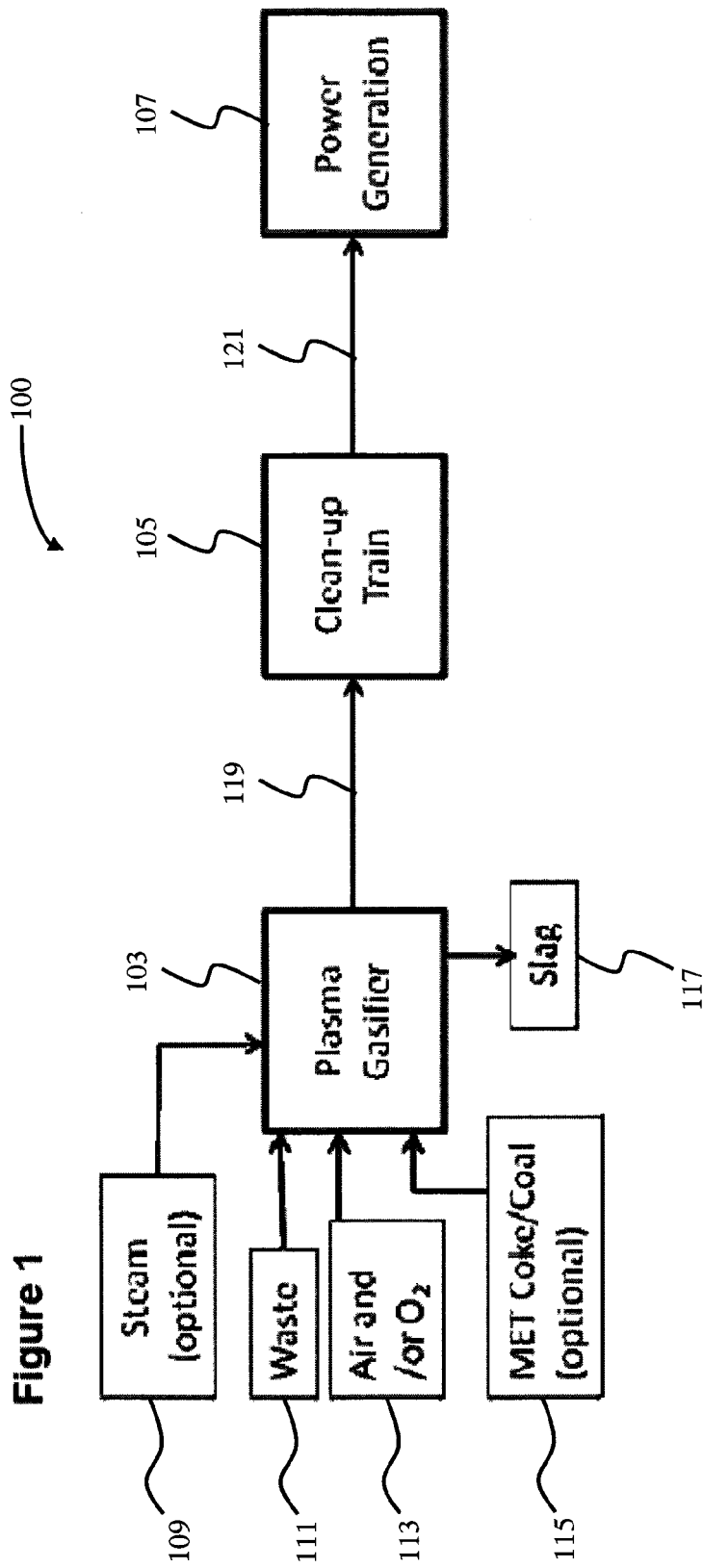
FIG. 1 shows an exemplary plasma gasification system according to an embodiment of the disclosure.

The present disclosure provides gas treatment processes and systems for treating high particulate containing syngas streams that efficiently treat syngas streams typically formed from plasma gasification of waste streams, to provide clean syngas suitable for power generation, liquid fuel or chemical manufacture, hydrogen production, or other applications that utilize CO and/or $H_2$. FIG. 1 shows an embodiment according to the present disclosure, wherein a treatment system 100 includes a series of systems for gasification of waste, removal of impurities, and power generation. The system includes the plasma gasifier 103, a gas treatment system 105, and a power generation system 107.

As shown in FIG. 1, plasma gasifier 103 receives and processes waste feed 111. Conditions for the plasma gasification of waste involve high temperatures, a pressurized/non-pressurized reaction vessel and an oxidizer feed 113, such as air and/or oxygen (e.g., temperatures of about 1200 to about 3000 F). When waste is utilized as a feed stream, the waste may or may not be pre-sorted prior to gasification to remove recyclable materials such as glass, plastic, and metals, and may be co-fired with high carbon-containing feedstocks 115, such as coal and/or metallurgical coke and/or petroleum coke and/or or alternative carbon sources, if desired. Types of waste that may be amenable to a gas treatment process are MSW, commercial waste, industrial waste, construction and demolition waste, hazardous waste, RFD, or combinations thereof. The process produces a slag stream 117 with molten metals/inorganics from one portion of the plasma gasifier and a crude syngas stream 119 from another portion of the plasma gasifier. By "crude syngas stream" it is meant that the syngas stream is the effluent of a waste gasification process, such as plasma gasification, and may comprise CO, $H_2$, $H_2O$, HCN, $CO_2$, $N_2$, $O_2$, $CH_4$, $H_2S$, COS, $NH_3$, HCl, Ar, Hg, $C_xH_y$, and heavier hydrocarbon compounds such as and including tars, particulates comprising char, ash, and/or unconverted fuel. Crude syngas streams include widely varying gas and hydrocarbon compounds compositions as well as particulate amounts and sizes coming out of the gasifier, which vary according to the waste being gasified.

To provide a support bed for waste and to enable the flow of slag and transport of gas, optional high carbon-containing feedstocks 115, such as coke or coal or alternative carbon sources may be employed.

Steam, 109, may optionally be added to adjust the composition of the syngas or to moderate the temperature of the syngas.

As shown in FIG. 1, the crude syngas stream 119 is fed to a gas treatment system 105, wherein impurities, such as particulates, heavier hydrocarbon compounds, tars, HCl, $NH_3$, water, mercury, $H_2S$, COS, inerts, hydrocarbons and other impurities are removed from syngas to form a clean syngas stream 121. By "clean syngas stream" it is meant that the syngas is sufficiently free of impurities for use in combustion for power generation, for use in liquid fuel or chemical manufacture, for hydrogen production, CO production, and/or for applications that utilize CO and/or $H_2$. Specifically, the particulate content of the clean syngas stream 121 is less than about 30 mg/$Nm^3$ or between about 1 and 30 mg/$Nm^3$ if fed to a gas turbine for power generation. Also the total sulfur content of the clean syngas should be below about 100 ppm, or below about 10 ppm if used for power generation or less than about 1 ppm if used for downstream catalytic processes.

The clean syngas stream 121 may be a clean syngas stream for power production, which is fed to a power generation system 107 wherein the syngas is combusted or otherwise utilized to generate power. In other embodiments, the power generation system 107 may be replaced with a chemical or liquid fuels manufacturing process such as the Fischer-Tropsch process, a hydrogen separation unit or series of units to produce clean hydrogen, a CO separation unit or series of units to produce CO, or other unit or device that utilizes syngas for chemical synthesis or other process that utilizes CO and/or $H_2$.

Figure 2:
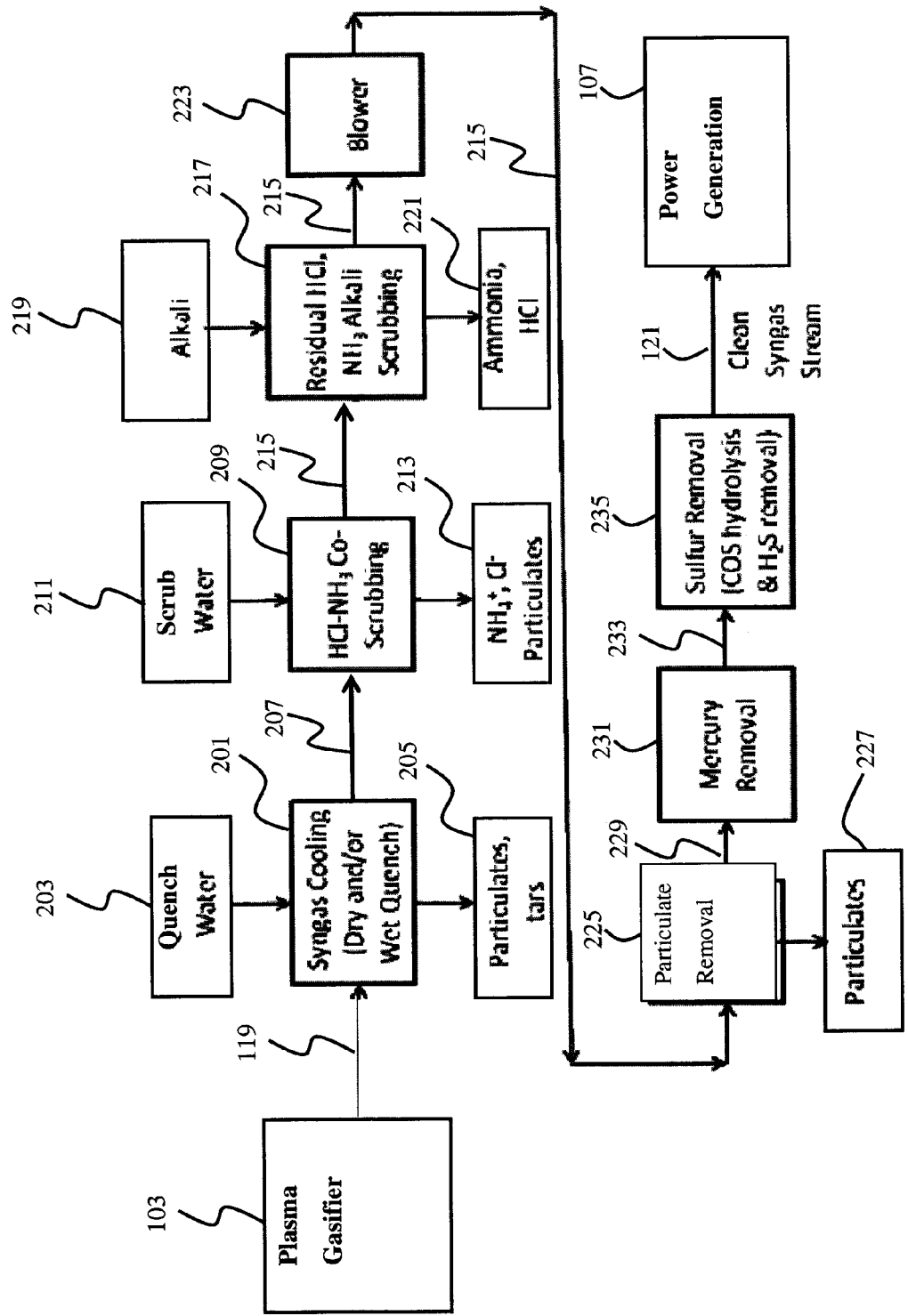
FIG. 2 shows an exemplary gas treatment system according to an embodiment of the disclosure.

FIG. 2 shows a schematic view of the gas treatment system 105 for removing impurities from crude syngas stream 119. The particulate-laden crude syngas stream 119 from the plasma gasifier 103 is cooled in a quench sub-system 201. The hot syngas is provided to the quench sub-system at a high temperature, for example 1500-2200° F., and is contacted with water at a lower temperature, such as water at ambient temperature and atmospheric pressure. The crude syngas stream 119 includes a high particulate load. In particular, crude syngas streams 119 formed from plasma gasification of waste can contain up to about 50,000 mg/$Nm^3$ or from about 10,000 to 50,000 mg/$Nm^3$ particulates or from about 10,000 mg/$Nm^3$ to 30,000 mg/$Nm^3$. Either a dry or wet quench can be performed in the quench sub-system.

As shown in FIG. 2, a wet quench is done by contacting the crude syngas stream 119 with the quench liquid stream 203, which may include water, but other solvents can also be used. Quench liquid stream 203 can include water at ambient temperature and atmospheric pressure. This process can be carried out in any appropriate scrubbing equipment and depending upon the quantity of quench liquid stream 203 input, can significantly reduce the gas temperature. For example, a crude syngas stream 119 entering the quench sub-system 201 may be at a temperature of about 1500 to 2200° F. (816 to 1204° C.). The quenched syngas stream 207 may be at a temperature of less than about 212° F. (100° C.) or from about 150° F. (66° C.) to about 200° F. (93° C.) or from about 170° F. (77° C.) to about 200° F. (93° C.). A portion of the heavier hydrocarbon compounds and/or tars, particulates comprising char, ash, and/or unconverted fuels, if present in the gas stream, also are removed in a solid/liquid state in the quench effluent stream 205. The quench effluent stream 205 may be recycled to the quench liquid stream 203 and/or may be flushed with an excess of water and disposed.

Syngas exits the quench step at a temperature depending on the quench methodology and operating conditions. The output temperature can be between 100° F. (38° C.) and 212° F. (100° C.).

In one embodiment of the present disclosure, the wet quench is performed with a high volume of water, such as from 4 to 7 $m^3$/h relative to 1000 Nm3/h of syngas, to allow rapid cooling.

Dioxin and furan formation may occur when process temperatures are in the range of from about 250° C. (482° F.) to about 350° C. (662° F.) in the presence of oxygen, when carbon is in the particulates, and when all of these are present at adequate residence time to provide the conditions sufficient to produce dioxin and/or furan. Wet quenching may be performed under controlled temperatures, such as temperatures below 250° C. (482° F.), at residence times and controlled oxygen content to prevent dioxin/furan formation.

In another embodiment of the present disclosure, dry quenching replaces or supplements the wet quenching process. Dry quenching may be performed by evaporative cooling of water at controlled temperatures. In another embodiment of the present disclosure, quenched syngas stream 207 can be recycled to exchange heat with the crude syngas stream 119 to reduce the gas temperature of the syngas stream 119. In a further embodiment, steam can be mixed with crude syngas stream 119 to reduce the gas temperature of the syngas stream.

It is desirable to remove HCl and $NH_3$ prior to further processes that involve usage of activated carbon beds/catalysts, because HCl and $NH_3$ can cause fouling of the carbon beds and/or catalysts. As shown in FIG. 2, the quenched syngas stream 207 is provided to the co-scrubbing sub-system 209 for simultaneous removal or co-scrubbing of HCl and $NH_3$. The quenched syngas stream 207 contains between about 1000 and about 3000 ppm or between about 1000 and 5000 ppm HCl and between about 1000 and about 3000 ppm or between about 1000 and 5000 ppm $NH_3$, quantities which are higher than typically observed in syngas. In some embodiments acidic (such as HCl) or basic (such as NaOH) solutions may be added to the scrub liquid 211 to manage pH. In some embodiments, process water from the condensate of downstream coolers may be utilized as at least a portion of scrub liquid 211 in this step.

The crude syngas stream 119 according to embodiments of the present disclosure may include $NH_3$ and HCl in concentrations that can be simultaneously removed. In the absence of any external acid or base addition, the amount of $NH_3$ removal has a strong dependence on the ratio of HCl to $NH_3$. HCl removal can take place in the absence of $NH_3$ while complete $NH_3$ removal requires the presence of HCl. In one embodiment, the concentration of HCl and $NH_3$ is present in a similar or substantially similar concentration. The co-scrubbing sub-system 209 simultaneously removes HCl and $NH_3$ from the quenched syngas stream 207. Co-scrubbing is done in scrubbing equipment known for providing scrubbing such as Venturi scrubbers, spray nozzles, packed columns, or other suitable vessels. Scrub liquid 211 at ambient conditions enters the scrubber, for example at the top, and mixes with the quenched syngas stream 207 at temperatures from about 100°

F. (38° C.) to about 212° F. (100° C.) or from 170° F. (77° C.) to about 200° F. (93° C.). The contacting results in the removal of HCl and $NH_3$ as ions into the solution, as shown in Eqs. 1-2, below, and is removed as scrubber effluent 213. A part of the scrubber effluent 213 can be recycled, combined with scrub liquid 211 and added back to the co-scrubbing sub-system. Side reactions resulting in minimal concentrations of other ionic species may also take place. A side reaction of interest is the formation of ammonium chloride salt, as described in Eq. 3.

$$NH3(g)+H2O(l) \leftrightarrow NH4+(aq)+OH-(aq) \qquad Eq\ 1$$

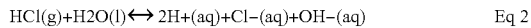
$$HCl(g)+H2O(l) \leftrightarrow 2H+(aq)+Cl-(aq)+OH-(aq) \qquad Eq\ 2$$

$$NH4+(aq)+Cl-(aq) \leftrightarrow NH4Cl(s) \qquad Eq\ 3$$

The co-existence of $NH_3$ and HCl at comparable concentrations permits complete or near complete removal of $NH_3$ using an embodiment of the present disclosure, thus about 95-99% removal of HCl and up to about 90% removal of $NH_3$ are expected in this case. It is also desirable to provide process conditions that minimize the amount of $NH_4Cl$ produced as $NH_4Cl$ particles are typically small and difficult to filter out. For example, post-quench crude syngas stream 207 temperatures of about 100° F. (38° C.) to about 200° F. (93° C.) with excess fresh water addition, for example from about 4 to about 7 $m^3$/hr per 1000 $Nm^3$/h syngas, shifts the equilibrium associated with this reaction in Eq. 3 to the left, leading to little or no $NH_4Cl$ formation. However, any remaining $NH_4Cl$, if any, will be removed at a particle removal sub-system, such as a wet ESP unit, downstream.

In one embodiment, an optional direct contact cooler 217 may be included subsequent to $NH_3$ and HCl co-scrubbing in the co-scrubbing sub-system 209 for further removal of $NH_3$, HCl, and particulates. This cooling may be done with a post scrub water stream 219 or other liquids such as, but not limited to, solvents and forms a post scrub effluent 221 that may include $NH_3$, HCl, and particulates that may remain after co-scrubbing. A part of the effluent 221 can be recycled, combined with liquid stream 219 and added back to the direct contact cooler.

In another embodiment, the co-scrubbing sub-system 209 or the direct contact cooler 217 can provide a scrubbed syngas stream 215 to an optional alkali scrub sub-system. In the alkali scrub sub-system, an alkali material, such as NaOH or other alkali reagent, is contacted with the scrubbed syngas stream 215 to adjust the pH of the system. Acid may also be used in the clean-up process to adjust pH.

Scrubbed syngas stream 215 exits the co-scrubbing sub-system 209, the direct contact cooler 217 or the alkali scrubbing sub-system, at temperatures between about 70° F. (21° C.) and about 150° F. (66° C.), substantially free of ammonia and HCl (e.g., comprising less than about 500 ppm ammonia and/or HCl). However, the scrubbed syngas stream 215 contains a significant concentration of particulates. The particulate content of the scrubbed syngas stream 215 depends on the quenching and scrubbing methods and operating conditions used. The particle size distribution of the input crude syngas stream 207 is also a factor in the particulate concentration in the scrubbed syngas stream 215. For example, about 500-2000 $mg/Nm^3$ of particulates may be present in the scrubbed syngas stream 215 at the input to the additional particulate removal sub-system 225.

The scrubbed syngas stream 215 is provided to a fluid moving device 223, such as a blower, wherein the scrubbed syngas stream 215 is provided to the additional particulate removal sub-system 225 (see FIG. 2). Particulate matter can be removed by several methods, including those that rely on electrostatic forces. One method includes wet electrostatic precipitation with an electrostatic precipitator that uses the force of an electrostatic charge to remove particles. The additional particulate removal sub-system 225 may include wet electrostatic removal of particulates with optional additional particulate removal, such as downstream baghouses, filters, and/or wet or dry scrubbing components. In one embodiment, the scrubbed syngas stream 215 is slightly pressurized above atmospheric conditions (e.g., a pressure of about 2-3 psig), with the fluid moving device 223 and sent to a wet electrostatic precipitator (WESP or wet ESP) for the further removal of particulate matter. In one embodiment, the wet ESP uses a vertical cylindrical tube with centrally-located electrode with water sprays to clean the collected particulate from the collection surface, which may include plates or tubes. The collected water and particulates form a wet film-slurry 227 that can be disposed. In one embodiment, the removal of particulates via electrostatic forces can occur both before and after the fluid moving device 223.

Figure 5:
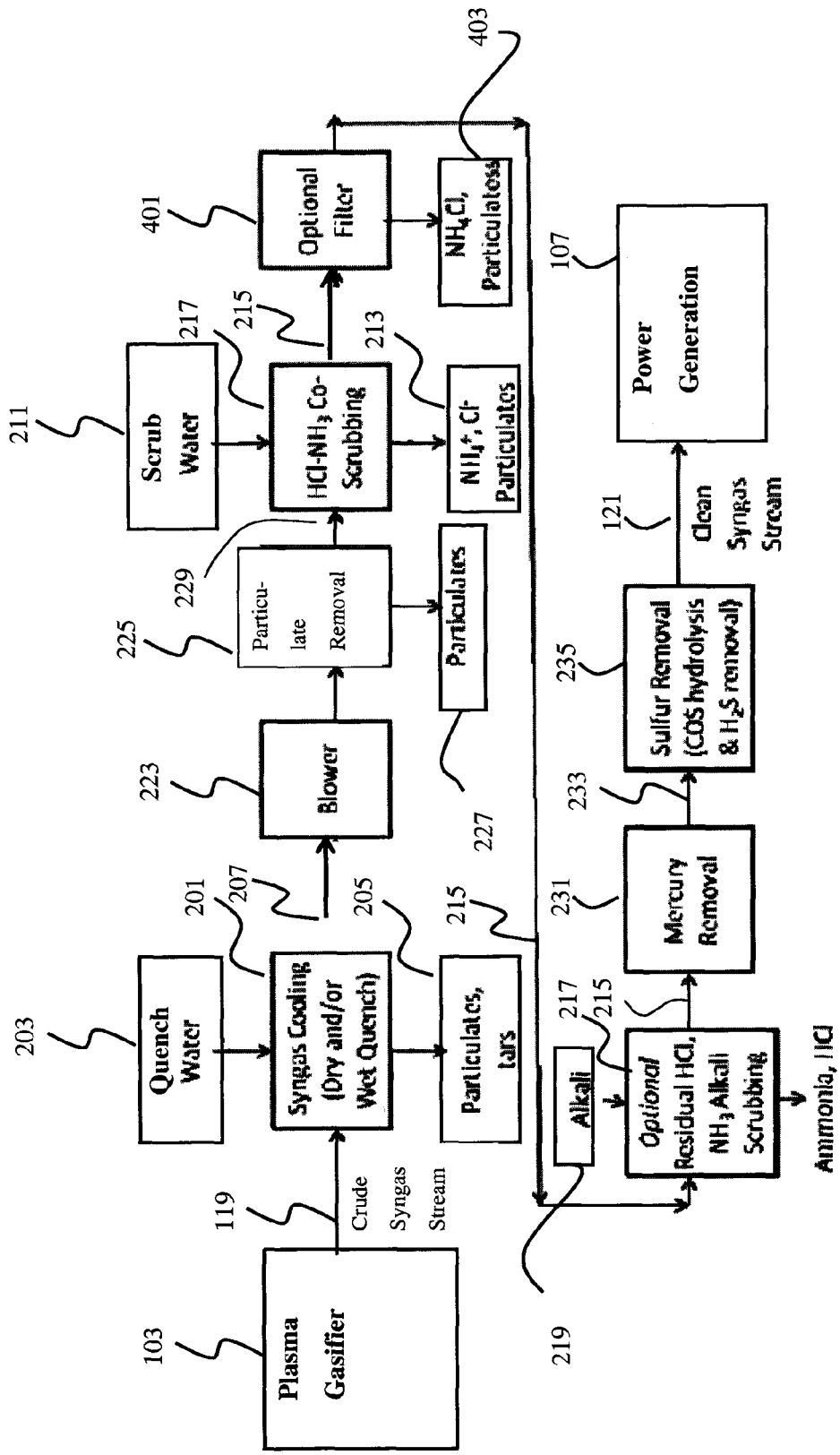
FIG. 5 shows an alternative exemplary gas treatment system according to an embodiment of the disclosure.

In certain cases with low particulate content in the crude syngas stream 119, the additional particulate removal sub-system 225 may precede the ammonia-HCl removal step as shown in FIG. 5. The reduced stream 229 at the exit of the wet ESP is slightly pressurized and can have a particulate content of less than about 50 $mg/Nm^3$ or less than about 25 $mg/Nm^3$ or less than about 10 $mg/Nm^3$ or less than about 3 $mg/Nm^3$. In certain embodiments wherein the clean syngas stream 121 is fed to a gas turbine for power generation, the output particulate content is preferably between 1 and 30 $mg/Nm^3$ or more preferably between 1 and 3 $mg/Nm^3$.

The particulate reduced stream 229 may contain mercury and sulfur in the form of COS and $H_2S$ as impurities that require removal. The particulate reduced stream 229 is provided to an optional mercury removal sub-system 231 (see FIG. 2). In one embodiment, the mercury removal sub-system 231 includes an activated carbon bed. In another embodiment the mercury removal sub-system 231 includes an activated carbon bed having granular activated carbon which can be impregnated by compounds, such as, but not limited to, sulfur that will chemically react with the mercury. The carbon bed is typically pressurized in certain embodiments to enhance capacity. The bed may be pressurized to about 110-150 psig or about 110-250 psig or up to about 350 psig. In another embodiment, mercury adsorption is performed at a temperature of less than about 158° F. and a relative humidity less than about 60% to further enhance capacity. Regeneration of the carbon bed can be performed by the reversal of conditions.

Sulfur is present in the particulate reduced stream 229 primarily in the form of $H_2S$ and COS as it is in the mercury reduced stream 233. For example, an exemplary mercury reduced stream 233 may contain about 500-2000 ppm of sulfur that is provided to the sulfur removal sub-system 235. In one embodiment, the mercury reduced stream 233 may include from about 1 to about 20% of sulfur present in the form of COS while the balance of the stream is present as $H_2S$.

The mercury reduced stream 233 is provided to the sulfur removal sub-system 235 (see FIG. 2). An exemplary sulfur removal process provided in the sulfur removal sub-system 235 includes COS hydrolysis to $H_2S$ and $H_2S$ removal.

The COS hydrolysis reaction is shown in Eq. 4 below. The reaction can take place on the surface of a hydrolysis catalyst, such as activated alumina. In some cases, the COS hydrolysis is preceded by a chloride guard bed, such as a packed carbon bed, to reduce or prevent fouling of the hydrolysis catalyst.

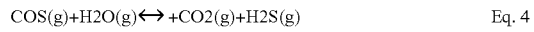
$$COS(g)+H2O(g) \leftrightarrow +CO2(g)+H2S(g) \qquad Eq.\ 4$$

The second step includes H2S removal by an iron chelate process where the $H_2S$ bearing gas stream (i.e., mercury reduced stream 233 in FIG. 2) is contacted with a dilute, aqueous, mildly alkaline, reactive ferric chelate solution of ethylenediaminetetraacetic acid (EDTA chelate) using a variety of gas-liquid contactors such as a spray nozzle, a packed bed scrubber, or other known vessel arrangement for gas-liquid contacting. H2S is oxidized to elemental sulfur which is precipitated and continuously removed. Ferrous chelates resulting from the redox reaction are simultaneously regenerated by oxidation. The reactions are shown in Eqs. 5-6 and the regeneration reactions are shown in Eqs. 7-8.

$$H_2S(g) \leftrightarrow H_2S(aq) \quad \text{Eq 5}$$

$$H_2S(aq)+2Fe^{3+}\text{Chelat}^{n-} \rightarrow S(s)+2H^{+}+2Fe^{2+}\text{Chelat}^{n-} \quad \text{Eq 6}$$

$$O_2(g) \leftrightarrow O_2(aq) \quad \text{Eq 7}$$

$$O_2(aq)+4Fe^{2+}\text{Chelat}^{n-}+2H_2O \rightarrow 4Fe^{3+}\text{Chelat}^{n-}+4OH^{-} \quad \text{Eq 8}$$

Figure 6:
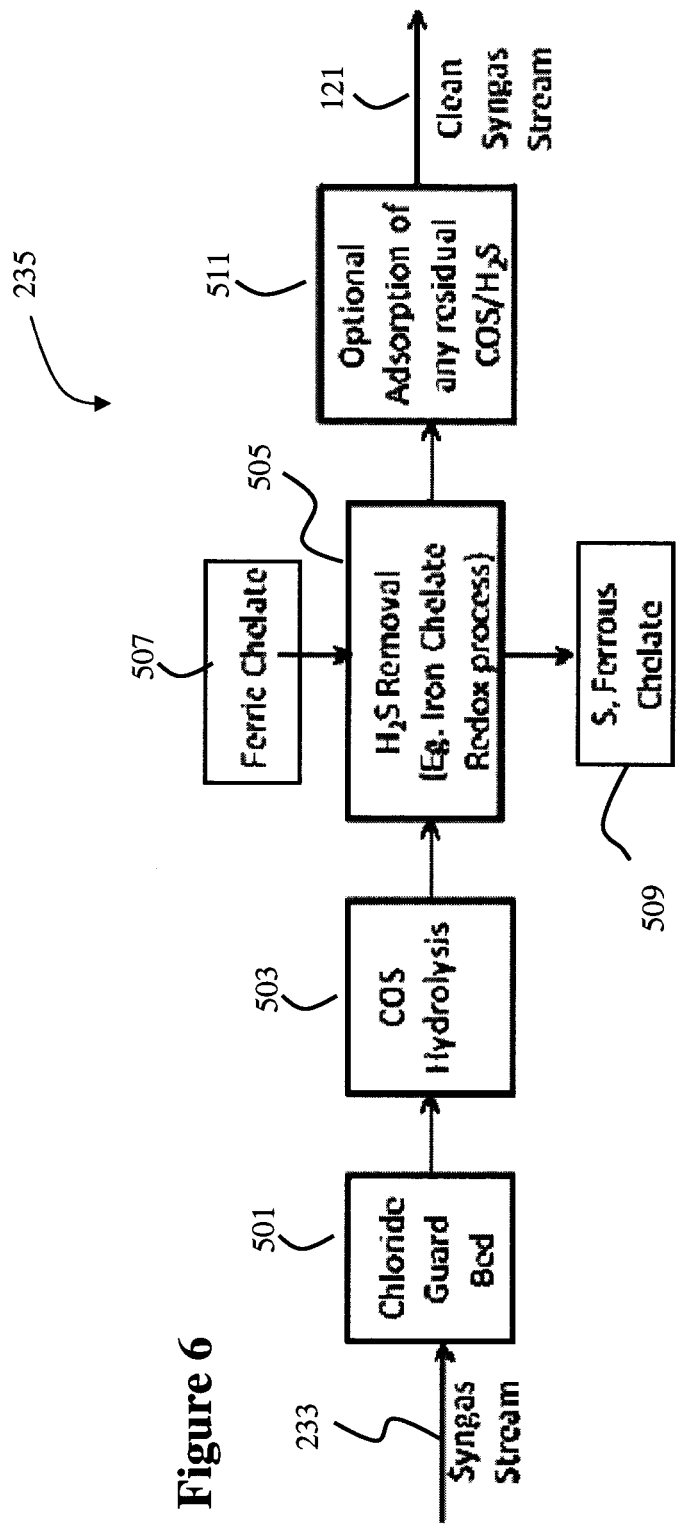
FIG. 6 shows an exemplary sulfur removal sub-system according to an embodiment of the disclosure.
Figure 7:
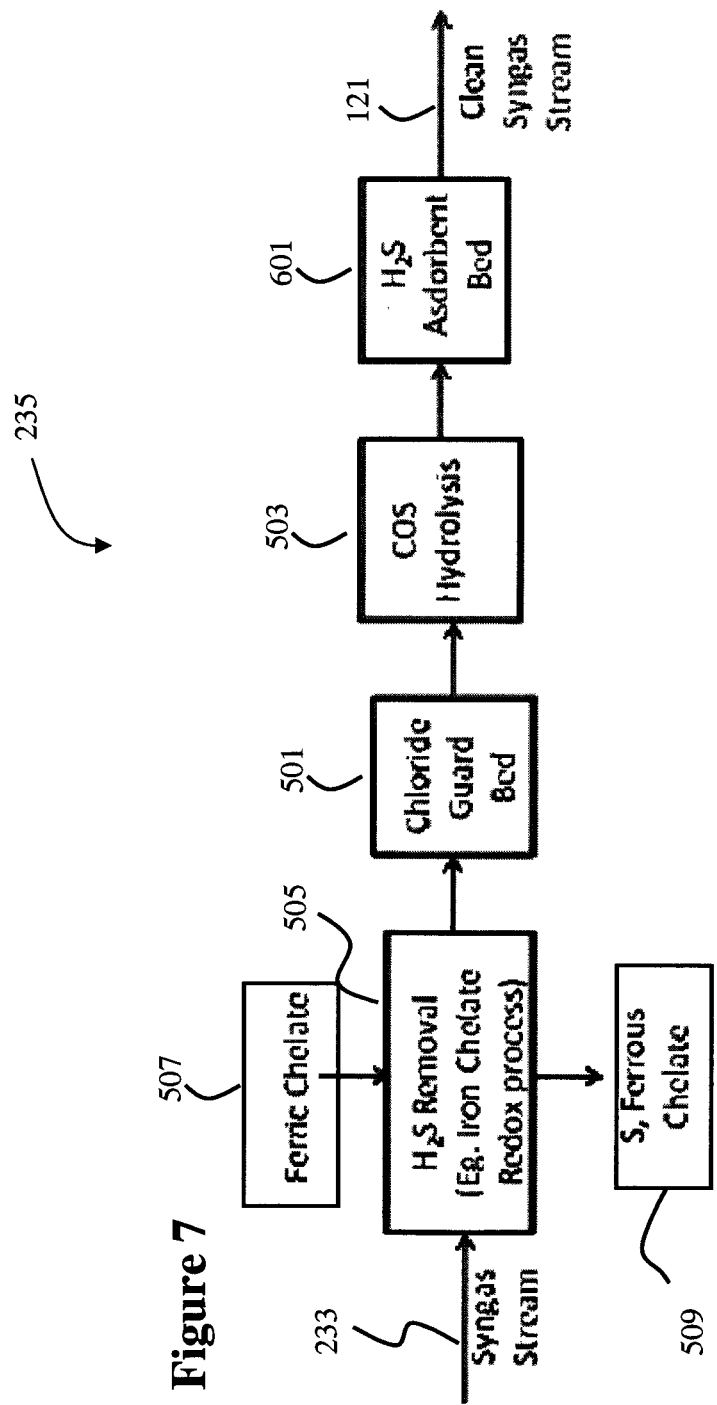
FIG. 7 shows an alternate exemplary sulfur removal sub-system according to an embodiment of the disclosure.
Figure 8:
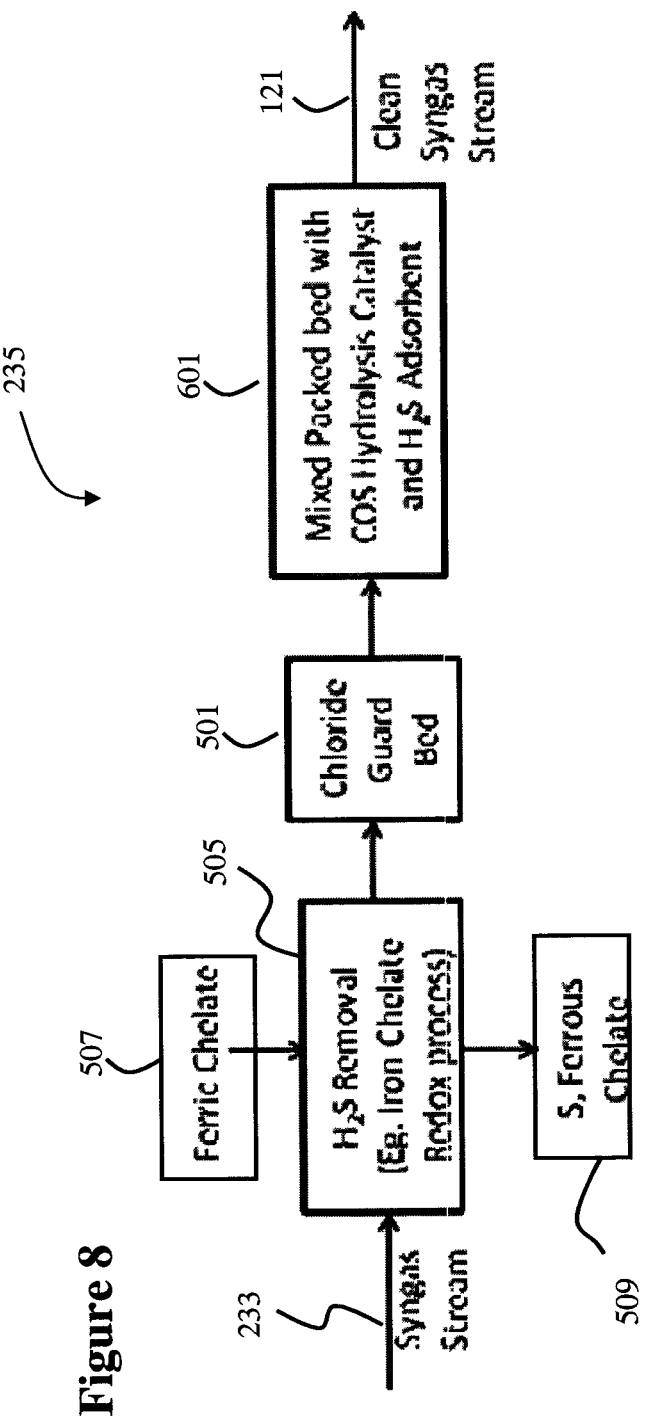
FIG. 8 shows an alternate exemplary sulfur removal sub-system according to an embodiment of the disclosure.

FIGS. 6-8 show various embodiments of sulfur removal sub-systems according to embodiments of the present disclosure.

FIG. 6 shows a sulfur removal subsystem 235, wherein COS hydrolysis is followed by H$_2$S removal to convert the majority, or all, of the COS to H$_2$S prior to H$_2$S removal. As shown in FIG. 6, the mercury reduced syngas stream 233 is provided to a chloride guard bed 501. The chloride guard bed 501 removes remaining chlorides present in the syngas. The chloride guard bed 501 may be an activated carbon bed. The syngas from the chloride guard bed is provided to a COS hydrolysis reactor 503, wherein the COS is converted to H$_2$S. The syngas from the COS hydrolysis reactor 503 is then provided to a H$_2$S removal reactor 505. The H$_2$S removal reactor 505 removes H$_2$S from the syngas by providing a ferric chelate 507, which contacts and reacts with the H$_2$S in the syngas according to Eq. 6, shown above. The effluent 509 from the H$_2$S removal reactor 505 may include sulfur and ferrous chelate. The syngas leaving the H$_2$S removal reactor 505 can be provided to an H$_2$S sorbent bed such as copper or zinc oxides or hydroxides. A combined packed bed with the hydrolysis catalyst in series with the H$_2$S sorbent may be used. The syngas leaving the H$_2$S sorbent bed is clean syngas stream 121 suitable for power generation, fuels or chemical manufacture, hydrogen production, or other application that utilizes CO and/or H$_2$.

FIG. 7 shows a sulfur removal subsystem 235, wherein H$_2$S removal is performed prior to COS hydrolysis. COS hydrolysis, and the removal of H$_2$S produced therein, is done using an iron chelate process. As shown in FIG. 6, the mercury reduced syngas stream 233 is provided to a H$_2$S removal reactor 505. The H$_2$S removal reactor 505 removes H$_2$S from the syngas by providing a ferric chelate 507, which contacts and reacts with the H$_2$S in the syngas according to Eq. 6, shown above. The effluent 509 from the H$_2$S removal reactor 505 may include sulfur and ferrous chelate. The syngas leaving the H$_2$S removal reactor 505 can be provided to a chloride guard bed 501. The syngas from the chloride guard bed 501 is provided to the COS hydrolysis reactor 503, wherein the COS is converted to H$_2$S. The syngas from the COS hydrolysis reactor 503 is then provided to a H$_2$S sorbent bed to absorb H$_2$S remaining in the syngas. The syngas leaving the H$_2$S sorbent bed 601 is clean syngas stream 121 suitable for power generation, fuels or chemical manufacture, hydrogen production, or other application that utilizes CO and/or H$_2$. An advantage of this embodiment is that it allows for better conversion of COS to H$_2$S, thus enabling better sulfur removal.

FIG. 8 shows a sulfur removal subsystem 235, wherein H$_2$S removal is performed prior to COS hydrolysis. COS hydrolysis, and the removal of H$_2$S produced therein, is done in a mixed packed bed with H$_2$S sorbent and COS hydrolysis catalyst. As shown in FIG. 8, the mercury reduced syngas stream 233 is provided to a H$_2$S removal reactor 505. The H$_2$S removal reactor 505 removes H$_2$S from the syngas by providing a ferric chelate 507, which contacts and reacts with the H$_2$S in the syngas according to Eq. 6, shown above. The effluent 509 from the H$_2$S removal reactor 505 may include sulfur and ferrous chelate. The syngas leaving the H$_2$S removal reactor 505 can be provided to a chloride guard bed 501. The syngas from the chloride guard bed 501 is provided to a mixed packed bed 601, containing H$_2$S sorbent and COS hydrolysis catalyst. The mixed packed bed 601 performs COS hydrolysis to H$_2$S and removes H$_2$S. The syngas leaving the mixed packed bed 601 is clean syngas stream 121 suitable for power generation, fuel or chemical manufacture, hydrogen production, or other application that utilizes CO and/or H$_2$. An advantage of this system is that it allows for a reduction of unit operations, thereby potentially reducing cost.

As shown in FIG. 2, the resultant clean syngas stream 121 is provided to a power generation system 107 to produce power.

Figure 3:
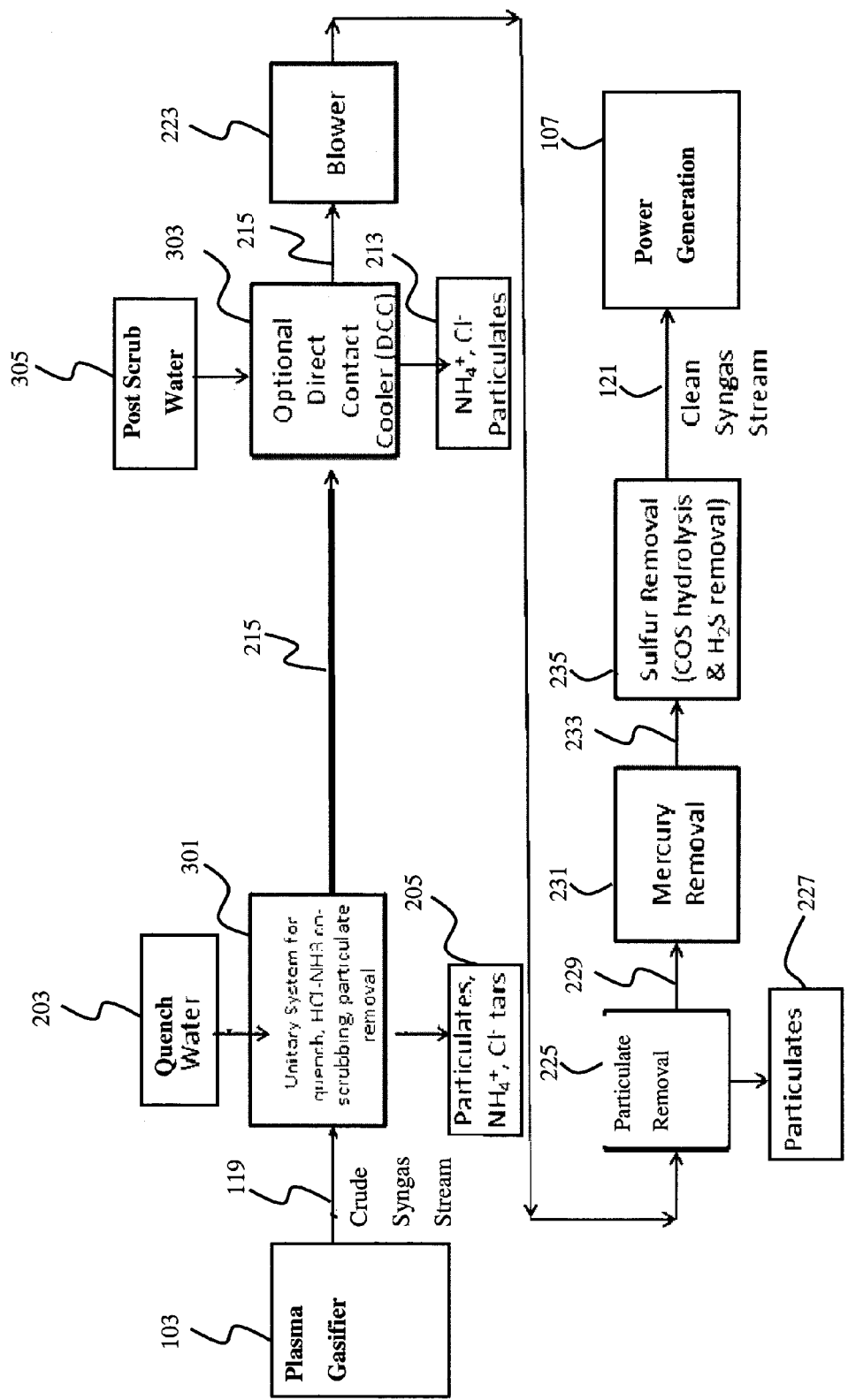
FIG. 3 shows an alternate exemplary gas treatment system according to an embodiment of the disclosure.

Although any suitable quenching apparatus may be used for quenching in the crude syngas stream quenching sub-system 201, one embodiment shown in FIG. 3 includes an embodiment wherein a unitary sub-system 301, such as a dual Venturi scrubber vessel, is utilized for the system and process. When a dual Venturi scrubber vessel is the unitary sub-system 301, the quenching step is performed in the first Venturi while further cooling, co-removal of ammonia and HCl, which is described in greater detail above, and further removal of particulates is performed in the second Venturi. In this embodiment, the crude syngas stream 119 is passed through a Venturi scrubber wherein there is a unitary process comprising contacting quench water 203 with the crude syngas stream 119 to cool the crude syngas stream 119, remove particulates from the crude syngas stream 119 and simultaneously remove ammonia and HCl from the crude syngas stream 119 to form effluent 205. Tar removal from the crude syngas stream 119 is increased by the use of unitary sub-system 301. Sufficient removal of tar is provided by the use of unitary sub-system 301 so that clogging of the vessels utilized for the quench, co-scrubbing and/or particulate removal due to tar formation is reduced or eliminated. The scrubbed syngas stream 215 leaves the unitary sub-system 301 and has a particulate content of up to about 10,000 mg/Nm$^3$ or from 500 to 10,000 mg/Nm$^3$ or from 500-2000 mg/Nm$^3$. In one embodiment, an optional direct contact cooler 217 may be included subsequent to NH$_3$ and HCl co-scrubbing for further removal of NH$_3$, HCl, and particulates. This cooling may be done with a post scrub water stream 219 or other liquids such as, but not limited to, solvents and forms a post scrub effluent 221 that may include NH$_3$, HCl, and particulates that may remain after co-scrubbing. As shown in FIG. 3, the scrubbed syngas stream 215 is provided to a fluid moving device 223 wherein the fluid is pressurized and then provided to an additional particulate removal sub-system 225. The additional particulate removal sub-system 225 includes the components and operates in the manner described above with respect to FIG. 2. The particulate reduced stream 229 is provided to the mercury removal sub-system 231 wherein mercury is removed. The mercury removal sub-system 231 includes the components and operates in the manner described above with respect to FIG. 2. As shown in FIG. 3, the mercury reduced syngas 233 from the mercury removal sub-system 231 is provided to the sulfur removal sub-system 235 wherein sulfur is removed to form a clean syngas stream 121. The sulfur removal sub-system 235 includes the components and operates in the manner described above with respect to FIG. 2. As shown in FIG. 3, the resultant clean syngas stream 121 is provided to a power generation system 107 to produce power.

Figure 4:
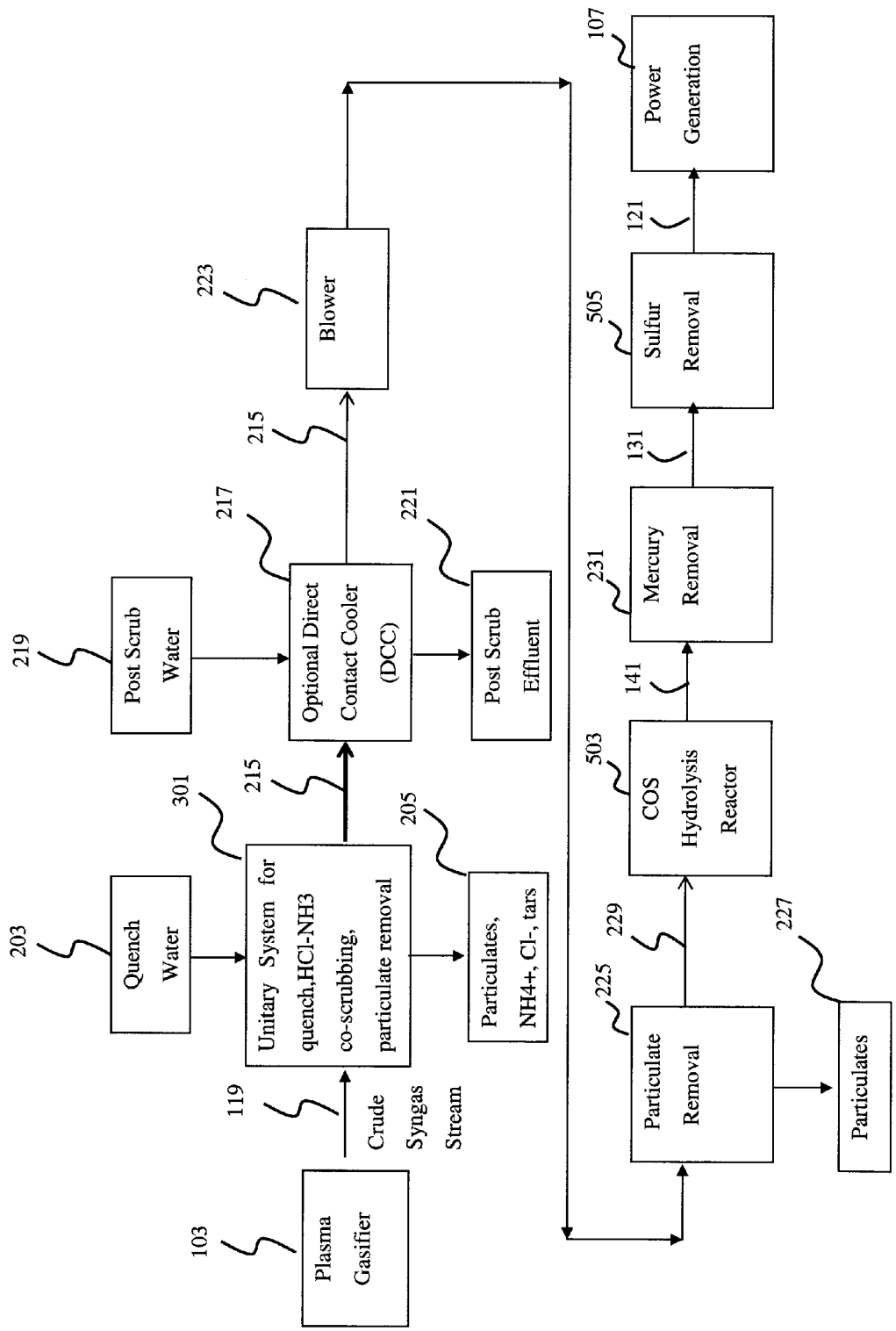
FIG. 4 shows an alternate exemplary gas treatment system according to an embodiment of the disclosure.

Referring now to FIG. 4, FIG. 4 illustrates another embodiment wherein the particulate removal from the scrubbed syngas stream 215 is carried out via electrostatic precipitation using the additional precipitation sub-system, the order of further treatment of the particulate reduced stream 229 is altered to provide optimum mercury and sulfur removal. FIG. 4 includes an embodiment wherein a unitary sub-system 301, such as a dual Venturi scrubber vessel, is utilized for the system and process. When a dual Venturi scrubber vessel is the unitary sub-system 301, the quenching step is performed in the first Venturi while further cooling, co-removal of ammonia and HCl, which was described in greater detail above, and further removal of particulates is performed in the second Venturi. In this embodiment, the crude syngas stream 119 is passed through a Venturi scrubber wherein there is a unitary process comprising contacting quench water 203 with the crude syngas stream 119 to cool the crude syngas stream 119, remove particulates from the crude syngas stream 119 and simultaneously remove ammonia and HCl from the crude syngas stream 119 to form effluent 205. Tar removal from the crude syngas stream 119 is increased by the use of unitary sub-system 301. Sufficient removal of tar is provided by the use of unitary sub-system 301 so that clogging of the vessels utilized for the quench, co-scrubbing and/or particulate removal due to tar formation is reduced or eliminated. The scrubbed syngas stream 215 leaves the unitary sub-system 301 and has a particulate content of up to about 10,000 mg/Nm$^3$ or from 500 to 10,000 mg/Nm$^3$ or from 500-2000 mg/Nm$^3$. In one embodiment, an optional direct contact cooler 217 may be included subsequent to $NH_3$ and HCl co-scrubbing for further removal of $NH_3$, HCl, and particulates. This cooling may be done with a post scrub water stream 219 or other liquids such as, but not limited to, solvents and forms a post scrub effluent 221 that may include $NH_3$, HCl, and particulates that may remain after co-scrubbing. As shown in FIG. 4, the scrubbed syngas stream 215 is provided to a fluid moving device 223 wherein the fluid is pressurized and then provided to an additional particulate removal sub-system 225. The particulate removal sub-system 225 includes the components and operates in the manner described above with respect to FIG. 3 and may be any electrostatic precipitation device. The particulate reduced stream 229 is provided to a carbonyl sulfide (COS) hydrolysis reactor 503 to give the hydrolyzed syngas stream 141. This hydrolyzed stream 141 is then provided to the mercury removal system 231 to give reduced mercury syngas stream 131. This reduced mercury syngas stream 131 is then provided to sulfur removal system 505 to give the resultant clean syngas stream 121. As shown in FIG. 4 the resultant clean syngas stream is provided to a power generation system 107 to produce power.

In another embodiment where the crude syngas stream includes a lower particulate content, the ammonia-HCl co-scrubbing may be performed subsequent to the additional particulate removal sub-system 225 to allow for upstream removal of particulates to enable better handing of the gas stream. This embodiment has been shown in FIG. 5. The system may involve a fine filter after the ammonia and HCl co-removal to eliminate any trace ammonium chloride present. The gas treatment system 105 shown in FIG. 5 includes the same arrangement of plasma gasifier system 103 and quenching sub-system 201 as FIG. 2. The quenched syngas stream 207 is provided to a fluid moving device 223 wherein the fluid is pressurized and then provided to an additional particulate removal sub-system 225. The additional particulate removal sub-system 225 includes the components and operates in the manner described above with respect to FIG. 2. The particulate reduced stream 229 is provided to the co-scrubbing sub-system 209. The co-scrubbing sub-system 209 includes the components and operates in the manner described above with respect to FIG. 2. The scrubbed syngas stream 215 is provided to a filter 401 to remove particulates 403, including, but not limited to $NH_4Cl$. The scrubbed syngas stream 215 from the filter 401 is provided to an optional post scrub direct sub-system 217. The post scrub sub-system 217 includes the components and operates in the manner described above with respect to FIG. 2. As shown in FIG. 5, the syngas from the optional direct contact cooler post scrub sub-system 217 is provided to the optional mercury removal sub-system 231 wherein mercury is removed. The optional mercury removal sub-system 231 includes the components and operates in the manner described above with respect to FIG. 2. As shown in FIG. 5, the mercury reduced syngas 233 from the mercury removal sub-system 231 is provided to the sulfur removal sub-system 235 wherein sulfur is removed to form a clean syngas stream 121. The sulfur removal sub-system 235 includes the components and operates in the manner described above with respect to FIG. 2. As shown in FIG. 5, the resultant clean syngas stream 121 is provided to a power generation system 107 to produce power.

While any suitable apparatus and equipment can be used for conducting the inventive method or constructing the inventive system, examples of the foregoing include components that are commercially available. Specific examples of such components include a wet electrostatic precipitator offered by either TurboSonic or Lundberg and activated carbon for mercury removal from Calgon.

The following Examples are provided to illustrate certain embodiments of the instant invention and do not limit the scope of the claims appended hereto.

EXAMPLES

Example 1

A crude syngas stream having 40,000 mg/Nm$^3$ of particulates at a temperature of 1800° F. (982° C.) and a pressure of 0 psig is input at 65,000 Nm$^3$/hr into a syngas clean-up train. The crude syngas stream is fed to a dual Venturi scrubber where the gas is cooled with 290-445 m$^3$/hr of water, to between 150-200° F. (66-93° C.). Simultaneously a significant portion of the particulates, $NH_3$ and HCl is removed. Tar removal is enhanced by using a large quantity of water at a fast quenching rate in the dual Venturi scrubber.

Particulate removal in the dual Venturi scrubber could be between 50-90% depending on the particle size distribution. In this example, particulate concentration of the quenched syngas stream is about 10,000 mg/Nm$^3$. The gas passes through a direct contact cooler where the gas is further cooled to about 110° F. (43° C.), particulates are removed and HCl and $NH_3$ are further removed. 90-99% of the input 3000 ppm $NH_3$ and 95-99% of the input 3000 ppm HCl are removed by passing through the dual Venturi scrubber and the direct contact cooler. The wet ESP or the additional particulate removal sub-system removes remaining particulates from the syngas and exiting syngas has about 1-30 mg/Nm$^3$ particulates. Mercury is substantially removed on a sulfur-impregnated activated carbon bed, followed by a COS hydrolysis reactor where 90-95% of COS is hydrolyzed to $H_2S$ and a $H_2S$ removal system where 95-99% of $H_2S$ is removed by at the iron chelate process. The clean syngas stream is then combusted in a gas turbine, followed by a steam turbine (combined cycle operation) coupled with a HRSG. The clean syngas stream contains less than 50 mg/Nm$^3$ or 1-30 mg/Nm$^3$ or 1-3 mg/Nm$^3$ particulates, 30-150 ppm HCl, 30-300 ppm NH$_3$, 50-250 ppm H$_2$S, 25-50 ppm COS, and 0-10 ppm mercury.

Example 2

A crude syngas stream having 40,000 mg/Nm$^3$ of particulates at a temperature of 1800° F. (982° C.) and a pressure of 0 psig is input at 65,000 Nm$^3$/hr into a syngas clean-up train. The crude syngas is fed to a dual Venturi scrubber where the gas is cooled with 290-445 m$^3$/hr of water, to between 150-200° F. (66-93° C.). Simultaneously a significant portion of the particulates, NH$_3$ and HCl is removed. Tar removal is enhanced by using a large quantity of water at a fast quenching rate in the Venturi.

Particulate removal in the dual Venturi could be between 50-90% depending the particle size distribution. In this example, particulate concentration of the quenched syngas stream is about 10,000 mg/Nm$^3$. The gas passes through a direct contact cooler where the gas is further cooled to about 110° F. (43° C.), particulates are removed and HCl and NH$_3$ are further removed. 90% of the input 1000 ppm NH$_3$ and 95-99% of the input 3000 ppm HCl are removed by passing through the dual venturi scrubber and the direct contact cooler. The wet ESP removes remaining particulates from the syngas and exiting syngas has about 1-30 mg/Nm$^3$ particulates. Mercury is substantially removed on a sulfur-impregnated activated carbon bed, followed by a COS hydrolysis reactor where 90-95% of COS is hydrolyzed to H$_2$S and a H$_2$S removal system where 95-99% of H$_2$S is removed by at the iron chelate process. The clean syngas stream is then combusted in a gas turbine, followed by a steam turbine (combined cycle operation) coupled with a HRSG. The clean syngas stream contains less than 50 mg/Nm3 or 1-30 mg/Nm3 or 1-3 mg/Nm$^3$ particulates, 30-150 ppm HCl, 100 ppm NH$_3$, 50-250 ppm H$_2$S, 25-50 ppm COS, and 0-10 ppm mercury.

Comparative Example

A crude syngas stream having 40,000 mg/Nm$^3$ of particulates at a temperature of 1800° F. and a pressure of 0 psig is input at 65,000 Nm$^3$/hr into a syngas clean-up train. The crude syngas is fed to a dual Venturi scrubber where the gas is cooled with 290-445 m$^3$/hr of water, to between 150-200° F. (66-93° C.). Simultaneously a significant portion of the particulates, NH$_3$ and HCl is removed. Tar removal is enhanced by using a large quantity of water at a fast quenching rate in the Venturi.

Particulate removal in the dual Venturi could be between 50-90% depending the particle size distribution. In this example, particulate concentration of the quenched syngas stream is about 10,000 mg/Nm$^3$. The gas passes through a direct contact cooler where the gas is further cooled to about 110° F. (43° C.), particulates are removed and HCl and NH$_3$ are further removed. 50% of the input 3000 ppm NH$_3$ and 95-99% of the input 1000 ppm HCl are removed by passing through dual Venturi scrubber and the direct contact cooler. The wet ESP removes remaining particulates from the syngas and exiting syngas has about 1-30 mg/Nm$^3$ particulates. Mercury is substantially removed on a sulfur-impregnated activated carbon bed, followed by a COS hydrolysis reactor where 90-95% of COS is hydrolyzed to H$_2$S and a H$_2$S removal system where 95-99% of H$_2$S is removed by at the Iron chelate process. The clean syngas stream is then combusted in a gas turbine, followed by a steam turbine (combined cycle operation) coupled with a HRSG. The clean syngas stream contains less than 50 mg/Nm$^3$ or 1-30 mg/Nm$^3$ or 1-3 mg/Nm$^3$ particulates, 30-150 ppm HCl, 150 ppm NH$_3$, 50-250 ppm H2S, 25-50 ppm COS, and 0-10 ppm mercury.

Example 3

A crude syngas stream having 25,000 mg/Nm$^3$ of particulates at a temperature of 1800° F. (982° C.) and a pressure of 0 psig is input at 65,000 Nm$^3$/hr into a syngas clean-up train. The crude syngas stream is fed to a dual Venturi scrubber where the gas is cooled with 290-445 m$^3$/hr of water, to between 150-200° F. (66-93° C.). Simultaneously a significant portion of the particulates, NH$_3$ and HCl is removed. Tar removal is enhanced by using a large quantity of water at a fast quenching rate in the dual Venturi scrubber.

Particulate removal in the dual Venturi scrubber could be between 50-90% depending on the particle size distribution. In this example, particulate concentration of the quenched syngas stream is about 2,000 mg/Nm$^3$. The gas passes through a direct contact cooler where the gas is further cooled to about 110° F. (43° C.), particulates are removed and HCl and NH$_3$ are further removed. 90-99% of the input 3000 ppm NH$_3$ and 95-99% of the input 3000 ppm HCl are removed by passing through the dual Venturi scrubber and the direct contact cooler. The wet ESP removes remaining particulates from the syngas and exiting syngas has about 1-30 mg/Nm$^3$ particulates. Mercury is substantially removed on a sulfur-impregnated activated carbon bed, followed by a COS hydrolysis reactor where 90-95% of COS is hydrolyzed to H$_2$S and a H$_2$S removal system where 95-99% of H$_2$S is removed by at the iron chelate process. The clean syngas stream is then combusted in a gas turbine, followed by a steam turbine (combined cycle operation) coupled with a HRSG. The clean syngas stream contains less than 50 mg/Nm$^3$ or 1-30 mg/Nm$^3$ or 1-3 mg/Nm$^3$ particulates, 30-150 ppm HCl, 30-300 ppm NH$_3$, 50-250 ppm H$_2$S, 25-50 ppm COS, and 0-10 ppm mercury.

While the invention has been described with reference to certain aspects or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A process for treating a syngas stream, the process comprising:
  quenching the syngas stream with a liquid stream to cool the syngas stream and remove particulates;
  co-scrubbing the syngas stream to remove both HCl and ammonia from the syngas stream;
  removing additional particulate matter from the syngas stream; and
  removing sulfur from the syngas stream to form a clean syngas stream;
  wherein the process is a unitary process comprising simultaneously contacting water with the syngas stream to cool the syngas stream, removing the particulates from the syngas stream, and removing the ammonia and HCl from the syngas stream, where the syngas stream is the effluent of a waste gasifier and wherein there are no intermediate steps between the gasifier and the unitary process.

2. The process of claim 1, further comprising providing the clean syngas stream to at least one system selected from the group consisting of a power generation system, a liquid fuel or chemical manufacture system, hydrogen production system, and combinations thereof.

3. The process of claim 1, wherein the clean syngas stream is a clean syngas stream for power.

4. The process of claim 1 wherein the syngas stream is gasified waste with waste comprising at least one member selected from the group consisting of MSW, commercial and industrial waste, refuse derived fuel (RDF), construction and demolition waste, hazardous waste, oil waste, sewage waste, and combinations thereof.

5. The process of claim 1, wherein the co-scrubbing includes contacting the syngas stream with water.

6. The process of claim 1, wherein removing sulfur includes reacting COS in the syngas stream to convert COS to $H_2S$.

7. The process of claim 1, wherein removing sulfur includes reacting $H_2S$ in the syngas stream with iron chelate.

8. The process of claim 1, wherein removing sulfur includes contacting the syngas with a COS hydrolysis catalyst and $H_2S$ sorbent.

9. The process of claim 1, wherein the removing additional particulate matter includes relying on electrostatic forces.

10. The process of claim 1, further comprising removing mercury from the syngas stream after removing particulate matter.

11. A process for the clean-up of a syngas stream arising from waste gasification, the process comprising:
   providing a syngas stream from a waste gasification system, wherein the syngas stream comprises from about 10,000 to 50,000 mg/Nm3 particulates;
   quenching the syngas stream with a liquid stream to cool the syngas stream and remove at least one member selected from the group consisting of particulates, tars, other heavy hydrocarbon compounds and combinations thereof;
   co-scrubbing the syngas stream to remove both HCl and NH3 from the syngas stream;
   removing additional particulate matter from the syngas stream; and
   removing sulfur from the syngas stream to form the clean syngas stream,
   wherein the clean syngas stream comprises less than about 50 mg/Nm3 particulates;
   wherein quenching the syngas stream, co-scrubbing the syngas stream, and removing particulates from the syngas stream are simultaneously a unitary process, and there are no intermediate steps between the gasification system and the quenching step.

12. The process of claim 11, further comprising providing the clean syngas stream to a system selected from the group consisting of a power generation system, a liquid fuel or chemical manufacture system, hydrogen production system, a CO production system, a gaseous fuel production system, a substitute NG production system, a fuel cell system, and combinations thereof.

13. The process of claim 11, wherein the syngas stream is gasified waste with waste selected from MSW, commercial and industrial waste, refuse derived fuel (RDF), construction and demolition waste, hazardous waste, oil waste, sewage waste, and combinations thereof.

14. The process of claim 11, wherein the co-scrubbing includes contacting the syngas stream with water, which may be pH adjusted.

15. The process of claim 11, wherein removing sulfur includes reacting COS in the syngas stream to convert COS to $H_2S$.

16. The process of claim 11, wherein removing sulfur includes reacting $H_2S$ in the syngas stream with iron chelate.

17. The process of claim 11, wherein removing sulfur includes contacting the synthesis gas with a COS hydrolysis catalyst and $H_2S$ absorbent.

18. The process of claim 11, wherein the removing additional particulate matter includes a process which relies on electrostatic forces.

19. The process of claim 11, further comprising removing mercury from the syngas stream after removing particulate matter.

* * * * *